US012571639B2

(12) United States Patent
Linder

(10) Patent No.: US 12,571,639 B2
(45) Date of Patent: Mar. 10, 2026

(54) SYSTEM AND METHOD FOR IDENTIFYING TRIP PAIRS

(71) Applicant: Allstate Insurance Company, Northbrook, IL (US)

(72) Inventor: Eric M. Linder, Downers Grove, IL (US)

(73) Assignee: Allstate Insurance Company, Norhbrook, IL (US)

( * ) Notice: Subject to any disclaimer, the term of this patent is extended or adjusted under 35 U.S.C. 154(b) by 440 days.

(21) Appl. No.: 17/828,598

(22) Filed: May 31, 2022

(65) Prior Publication Data

US 2023/0384110 A1     Nov. 30, 2023

(51) Int. Cl.
*G01C 21/34*     (2006.01)
*G01C 21/36*     (2006.01)

(52) U.S. Cl.
CPC ..... *G01C 21/3492* (2013.01); *G01C 21/3461* (2013.01); *G01C 21/3605* (2013.01)

(58) Field of Classification Search
CPC ............ G01C 21/3492; G01C 21/3461; G01C 21/3605; G06F 16/29; G06F 16/137; G06F 16/152
USPC .................. 701/118, 532, 533, 454; 707/698
See application file for complete search history.

(56) References Cited

U.S. PATENT DOCUMENTS

| | | | |
|---|---|---|---|
| 9,650,051 B2 | 5/2017 | Hoye et al. | |
| 10,210,679 B1 | 2/2019 | Higgs et al. | |
| 10,309,787 B2 | 6/2019 | Strauf et al. | |
| 11,162,802 B2 | 11/2021 | Kreig et al. | |
| 2013/0304515 A1* | 11/2013 | Gryan | G06Q 40/08 |
| 2014/0058618 A1* | 2/2014 | Rude | G06Q 30/02 |
| 2014/0330506 A1 | 11/2014 | Ng et al. | |
| 2017/0016733 A1* | 1/2017 | Rolf | G01C 21/343 |
| 2019/0020973 A1* | 1/2019 | Harish | G01P 13/00 |
| 2020/0317216 A1* | 10/2020 | Konrardy | B60W 30/182 |
| 2021/0011437 A1* | 1/2021 | Migneco | H04W 4/40 |
| 2021/0123749 A1* | 4/2021 | Kreig | H04W 4/021 |
| 2021/0133888 A1* | 5/2021 | Leise | G06F 16/9024 |
| 2022/0383734 A1* | 12/2022 | Shah | G08G 1/0129 |
| 2024/0094019 A1* | 3/2024 | Sanchez | G01C 21/3415 |

OTHER PUBLICATIONS

International Search Report and The Written Opinion Of The International Searching Authority for International Application No. PCT/US2023/023182 dated Aug. 7, 2023 (15 pages).

(Continued)

*Primary Examiner* — Ramon A. Mercado
*Assistant Examiner* — Ellis B. Ramirez

(57) ABSTRACT

Implementations include classifying vehicle trips as similar to previous trips or trips reversed based on location information of a vehicle received from a location device. Unique tile identifiers of the trip, each corresponding to a geographic area and the location information, may be determined and used to generate a fingerprint of the trip. The derived trip fingerprint of the trip information may be compared to stored fingerprints of one or more previously received trips to determine if the new trip is similar to one or more of the previous trips or trips reversed. In one instance, two trips that share a similar route but in opposite directions may be identified as a trip pair and stored in a trip database as the trip pair.

12 Claims, 8 Drawing Sheets

(56) References Cited

OTHER PUBLICATIONS

Mariescu-Istodor Radu Radum@Cs Uef Fi et al., "Grid-Based Method for GPS Route Analysis For Retrieval", ACM Transactions on Spatial Algorithms and Systems, ACM, 2 Penn Plaza, Suite 701 New York NY10121-0701 USA, vol. 3, No. 3, Sep. 29, 2017 (Sep. 29, 2017), pp. 1-28.

* cited by examiner

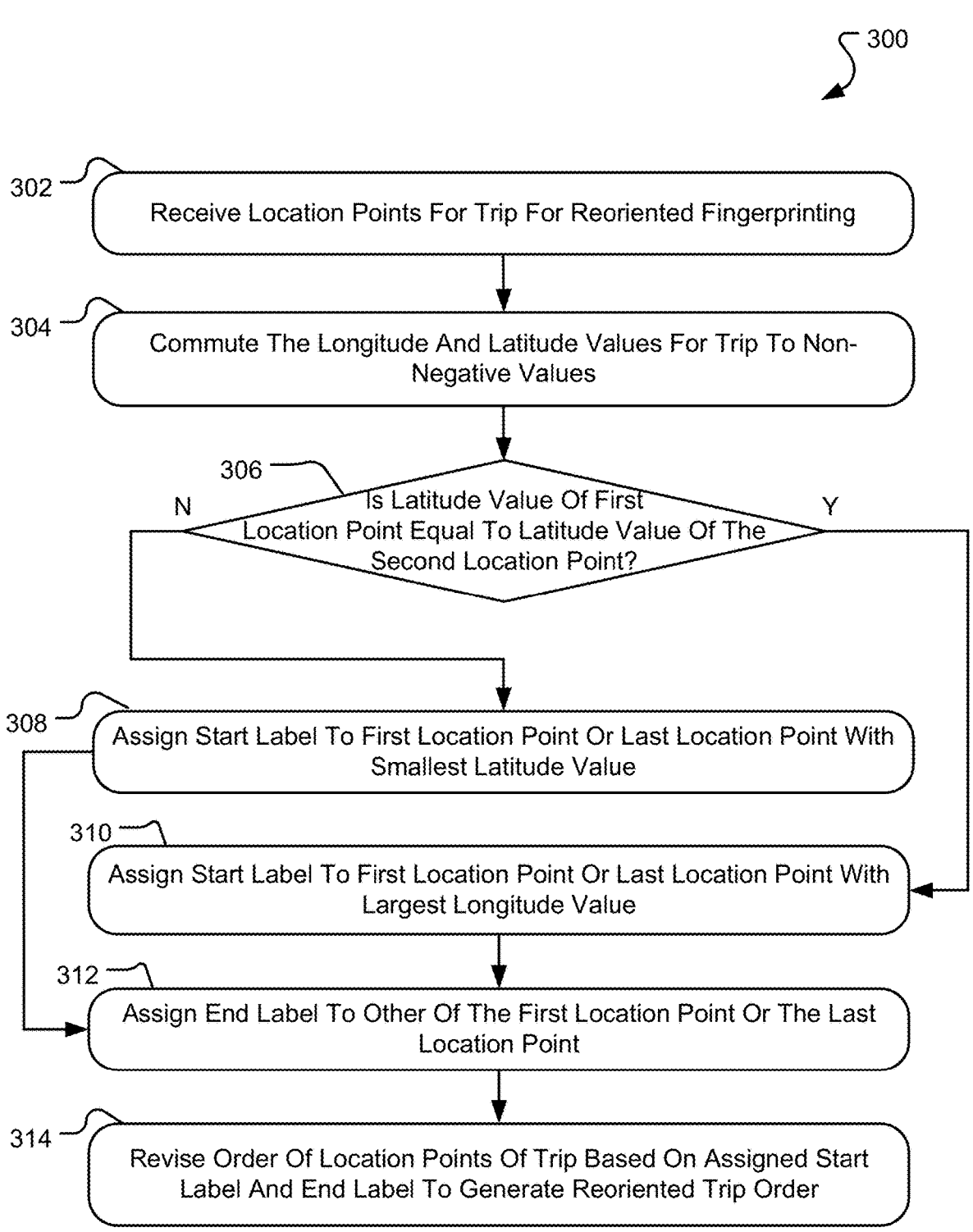

300

302 — Receive Location Points For Trip For Reoriented Fingerprinting

304 — Commute The Longitude And Latitude Values For Trip To Non-Negative Values

306 — Is Latitude Value Of First Location Point Equal To Latitude Value Of The Second Location Point?

N          Y

308 — Assign Start Label To First Location Point Or Last Location Point With Smallest Latitude Value 310 — Assign Start Label To First Location Point Or Last Location Point With Largest Longitude Value 312 — Assign End Label To Other Of The First Location Point Or The Last Location Point 314 — Revise Order Of Location Points Of Trip Based On Assigned Start Label And End Label To Generate Reoriented Trip Order

FIG. 3

500

502   Receive Location Points For Directionless Trip For Pairing

504   Locate And Connect Location Points On Geographic Map

506   Remove Corner Cutting From Connected Location Points As Indicated By Geographic Map 508   Generate Idealized Location Points From Inflection Points And Smoothing Of Connected Location Points 510   Identify Tiles For Trip From Idealized Locations, Including Latitude, Longitude, And Level Of Tiles 512   Adjust Idealized Locations Of Trip To Centroids Of Identified Tiles

FIG. 5

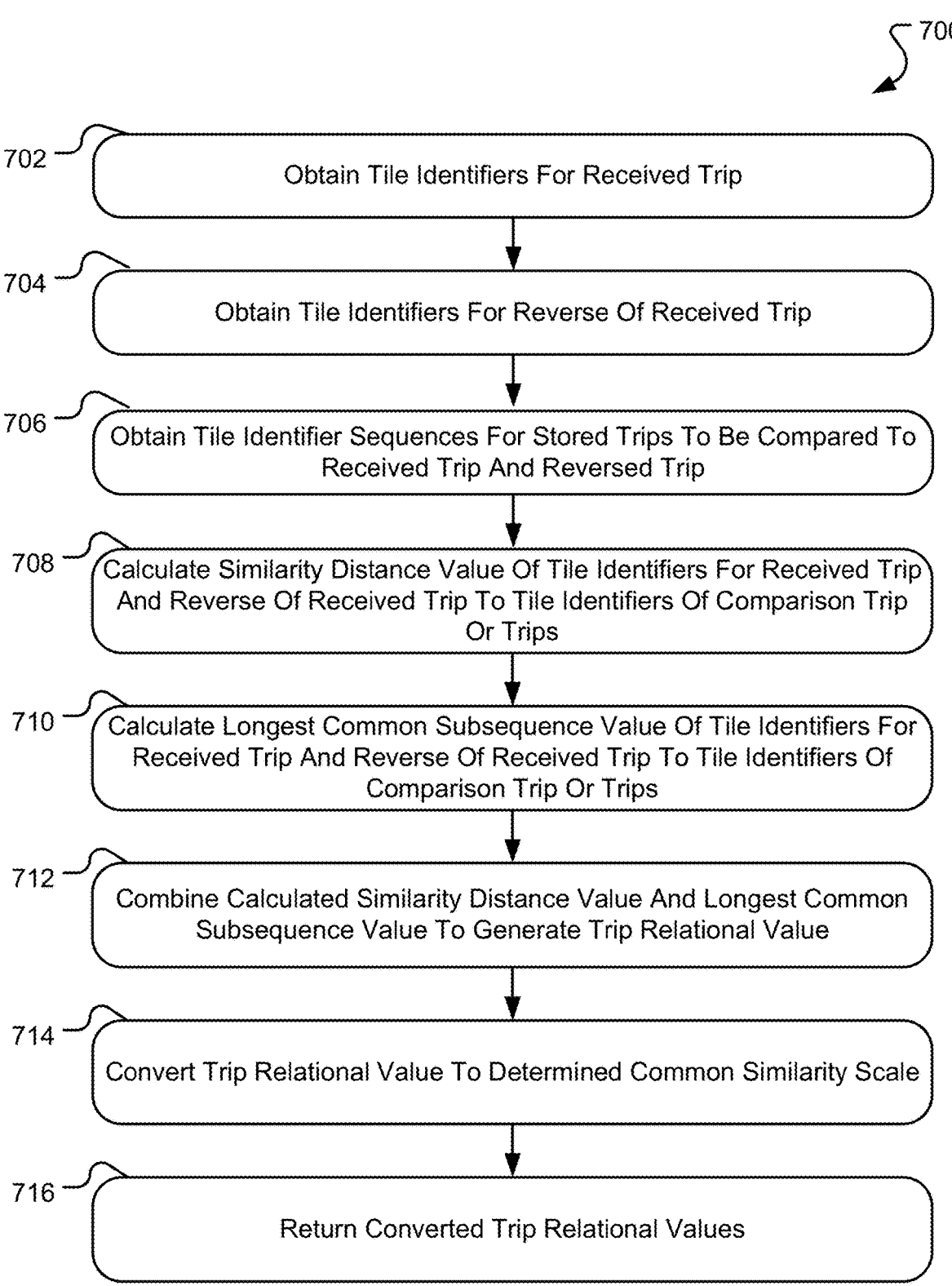

700

702 — Obtain Tile Identifiers For Received Trip

704 — Obtain Tile Identifiers For Reverse Of Received Trip

706 — Obtain Tile Identifier Sequences For Stored Trips To Be Compared To Received Trip And Reversed Trip 708 — Calculate Similarity Distance Value Of Tile Identifiers For Received Trip And Reverse Of Received Trip To Tile Identifiers Of Comparison Trip Or Trips 710 — Calculate Longest Common Subsequence Value Of Tile Identifiers For Received Trip And Reverse Of Received Trip To Tile Identifiers Of Comparison Trip Or Trips 712 — Combine Calculated Similarity Distance Value And Longest Common Subsequence Value To Generate Trip Relational Value 714 — Convert Trip Relational Value To Determined Common Similarity Scale 716 — Return Converted Trip Relational Values

FIG. 7

SYSTEM AND METHOD FOR IDENTIFYING TRIP PAIRS

TECHNICAL FIELD

Aspects of the present disclosure generally relate to systems and methods for data processing, and more specifically for classifying telematics data to identify similarities between dusters of data corresponding to vehicle trips.

BACKGROUND

Telematics data from vehicles may be processed in a variety of ways to gain an understanding of the operation of the vehicles. For example, acceleration data, speed data, braking data, heading data, and the like obtained from a device associated with an operated vehicle may be processed to determine aspects of the vehicle operation. Such processed data may be used to monitor how safely a driver operates a vehicle and/or to estimate the wear and tear on the vehicle's systems based on how the vehicle is operated. However, the operation of a vehicle may be dependent on a type of vehicle trip, such as a long road-trip comprising mostly freeway travel versus a commute to a driver's place of business. Therefore, classifying a trip of a vehicle may aid in the processing of telematics data associated with the trip and provide additional insight into the operation of the vehicle during the trip.

It is with these observations in mind, among other, that aspects of the present disclosure were conceived.

SUMMARY

Implementations described and claimed herein address the foregoing by providing systems and methods for identifying trip pairs. In one implementation, a method may include the operations of obtaining, by a classification system and from a location device associated with a vehicle, a plurality of location values associated with a vehicle trip, each of the plurality of location values comprising at least one geographic value and a sequence value and associating a reorientation start label to one of the plurality of location values based on a geographic value associated with the one of the plurality of location values. The method may further includes resequencing the plurality of location values, the resequenced plurality of location values based on the reorientation start label, deriving, from a plurality of geographic tile identifiers each associated with at least one of the resequenced plurality of location values, a pairing fingerprint value for the vehicle trip, and pairing the vehicle trip to at least one previous vehicle trip based a comparison of the pairing fingerprint value for the vehicle trip to a database of fingerprint values of previous trips.

Another implementation may include a system for pairing vehicle trip. The system may include a communication interface receiving a plurality of location values associated with a vehicle trip, each of the plurality of location values comprising at least one geographic value and a sequence value and determined by a location device associated with a vehicle, a processing device, and a non-transitory computer-readable medium encoded with instructions. When executed by the processing device, the instructions cause the processing device to assign a reorientation start label to a first or a last of the plurality of location values based on a geographic value associated with the first or the last of the plurality of location values and resequence the plurality of location values based on the reorientation start label. The instructions may further cause the processing device to determine, from a plurality of geographic tile identifiers each associated with at least one of the resequenced plurality of location values, a pairing fingerprint value for the vehicle trip and pair the vehicle trip to at least one previous vehicle trip based a comparison of the pairing fingerprint value for the vehicle trip to a database of fingerprint values of previous trips.

Yet another implementation may include a non-transitory, computer-readable medium storing instructions that, when executed by one or more processors, cause the one or more processors to perform the operations of identifying, from a database of geographic tile identifiers each based on at least one of a plurality of geographic location points associated with a vehicle trip, a plurality of sequenced geographic tile identifiers associated with the vehicle trip, each of the plurality of sequenced geographic tile identifiers defining a geographic region corresponding to at least one of the plurality of geographic location points and calculating a similarity distance value based on a comparison of the plurality of sequenced geographic tile identifiers associated with the vehicle trip to a list of geographic tile identifiers of at least one previous vehicle trip and stored in a database. The stored instructions may further cause the one or more processors to perform the operations of converting the similarity distance value to a relational value of a trip similarity scale and assigning the relational value to the at least one previous vehicle trip indicating a similarity of the vehicle trip to the at least one previous vehicle trip.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 3 is a flowchart illustrating an example method for reorienting location points of a trip to determine trip pairs.

FIG. 5 is a flowchart illustrating an example method for determining a plurality of tile identifiers for determining trip pairs.

FIG. 7 is a flowchart illustrating an example method for calculating a relational similarity between trips.

Figure 1:
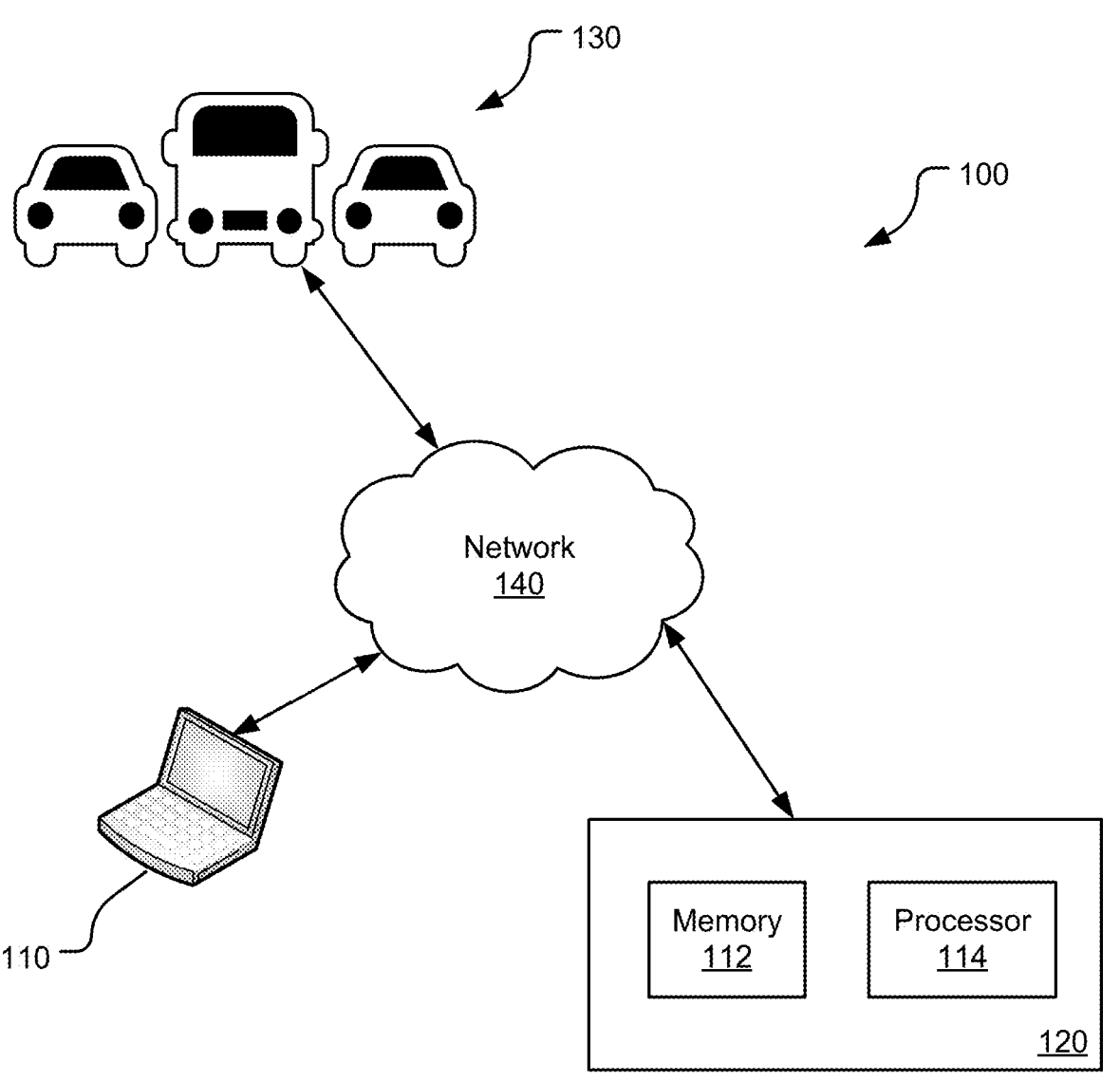
FIG. 1 illustrates an example operating environment for identifying trip similarities.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Aspects described herein relate to classifying vehicle trips, particularly for classifying trips that are similar in route based on telematics data received at a processing or computing device. In particular, a location device, such as a Global Positioning System (GPS) or other locating device, may be obtain location information of a vehicle or operator of a vehicle during a trip. Such location information may include one or more values, such as latitude values and/or longitude values, among other possible values associated with a geographic location. The location information/values, along with other telematics data, may be collected into a set as associated with a vehicle trip based on a determined starting point and/or ending point for the trip. The location information may then be processed to identify similarities of multiple trips, such as identifying a return trip following a similar route as an outbound trip. In another implementation, the location information may be used to determine a relative similarity between two or more trips. In some instances, a fingerprint or other type of unique identifier may be generated for one or more trips to determine similarities between the trips. In one implementation, each of the location information for a received trip may be correlated to a geographic tile, each tile corresponding to a geographic region. Each of the identified geographic tiles may be associated with a unique tile identifier value, either from a database of identifier values or derived from aspects of the geographic tile. The set of tile identifier values may, in some instances, be sequenced to correspond to the sequence of the location information obtained by the locating device during the vehicle trip. In other examples, the sequence of the location information may be reordered or reoriented such that the trip becomes "directionless" or agnostic to the order in which the location information is received. A similarity distance value may be calculated, in some instances, based on a comparison of the plurality of sequenced geographic tile identifiers associated with the vehicle trip to a list of geographic tile identifiers of at least one previous vehicle trip and stored in a database.

The set of tile identifier values of a received trip may be processed to generate a fingerprint for a vehicle trip. In one implementation, two or more of the unique identifier values of the geographic tiles may be combined and fingerprint value may be derived from the combined identifier values. For example, the combined tile identifier values may be processed through a repeatable hashing technique to generate a hashed value that may then be set as the fingerprint for the received trip. In this manner, the fingerprint of a trip is based on the location information of the trip received from the locating device. The trip fingerprint may be stored in a database of trip fingerprints, creating a history of vehicle trips for a particular vehicle or any number of vehicles. Further, the derived trip fingerprint of newly received trip information may be compared to stored fingerprints of one or more previously received trips to determine if the new trip is similar to one or more of the previous trips. In some instances, a relational value to the at least one previous vehicle trip indicating a similarity of the vehicle trip to the at least one previous vehicle trip may also be determined and/or assigned. If the fingerprint of the new trip matches or is similar to a previous trip, the new trip may be associated with the previous trip, such as through a combination of information of the two matching trips. In another example, the new trip information may be discarded as being duplicative of a previous trip already stored in the database.

In some implementations, information or data of a new trip may be augmented, altered, adjusted, etc. to aid in determining a similarity between two or more trips. For example, it may be useful to identify trip pairs, or a trip from a starting point to a destination point and the return trip along the same or similar route, such as a trip to the grocery store followed by a return trip home. To aid in identifying such trip pairs, the sequence of location information of two trips may be reoriented around a similar starting and/or ending location. Following the reorientation, fingerprints of the trips may be generated as described above and a comparison of the reoriented trip fingerprints may be conducted. Trips that have the same or similar reoriented trip fingerprint may then be identified or labeled as a trip pair. Such identification may enable a system to identify movement patterns of vehicles and vehicle users for many purposes, such as directed advertising, safety procedures, vehicle movement analysis, and the like.

In other implementations, a new trip may be compared to one or more previously received trips and a similarity between the new trip and the previous trips may be calculated. A determination of a similarity between a new trip and a previous trip may be based on applying many techniques, such as a Levenshtein Distance algorithm and/or a Longest Common Subsequence determination algorithm to between a list of tile identifier values for the new trip to one or more list of tile identifier values of previous trips maintained in a database of tile identifier lists. Other distance algorithms may also be used, such as a Hamming distance algorithm, cosine distance algorithm, and the like. The values obtained from the algorithms may converted to a common scale of values, such as converting the obtained values to a value between 0 and 10. The converted similarity value between the trips may then be ranked and/or displayed such that a relational similarity of a new trip to any number of previously received trips may be determined. Similar trips to a new trip, such as those trips with a relational similarity value of 3 or less may be identified and treated by a categorization system as similar to the new trip for processing purposes. This and other benefits may be realized through comparison of new trip information to information associated with previous trips taken by the vehicle or another vehicle.

These and various other arrangements will be described more fully herein. As will be appreciated by one of skill in the art upon reading the following disclosure, various aspects described herein can be a method, a computer system, or a computer program product. Accordingly, those aspects can take the form of an entirely hardware implementation, an entirely software implementation, or at least one implementation combining software and hardware aspects. Furthermore, such aspects can take the form of a computer program product stored by one or more computer-readable storage media having computer-readable program code, or instructions, included in or on the storage media. Any suitable computer-readable storage media can be utilized, including hard disks, CD-ROMs, optical storage devices, magnetic storage devices, secure digital cards (SD cards), solid-state drives (SSDs), cloud storage, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

FIG. 1 illustrates an operating environment 100 in accordance with at least one implementation. The operating environment 100 includes at least one client device 110, at least one classification server system 120, and/or at least one vehicle 130 in communication via a network 140. Client devices 110 and classification server systems 120 can allow for users to obtain telematics data from vehicles 130, generate trips, and/or classify trips, vehicles, and the like. The network 140 can include a local area network (LAN), a wide area network (WAN), a wireless telecommunications network, and/or any other communication network or combination thereof. Any of the devices and systems described herein can be implemented, in whole or in part, using one or more computing devices described with respect to FIG. 2. For example, classification server system 120 may include one or more processors 114 and a non-transitory memory 112. Client devices 110 and/or the at least one vehicle 130 may include similar components, in addition to other components described below.

Vehicle 130 can be, for example, an automobile, motorcycle, scooter, bus, recreational vehicle, boat, or other vehicle for which sensor or crash data can be collected and analyzed. A telematics device within the vehicle 130 can be used to collect and/or receive sensor data and/or to receive sensor data from the vehicle 130. A telematics device can be, for example, mobile phones, personal digital assistants (PDAs), tablet computers, laptop computers, smartwatches, and other devices that can be carried by drivers or passengers inside or outside of the vehicle 130. The telematics device can also be integrated into the vehicle 130 and/or connected to a data bus within the vehicle 130 via a diagnostic connector, such as an OBD-II connector. The telematics device can receive a variety of data, such as acceleration, velocity, location, vehicle operation data such as braking, turning, swerving, and the like from sensors located within the telematics device and/or vehicle. For example, a telematics device having a Global Positioning System (GPS) receiver can determine vehicle location, speed, direction, and other basic driving data without needing to communicate with vehicle sensors or external vehicle systems. However, it should be noted that any of a variety of other location determination techniques, such as location determined based on wireless networks to which the mobile device is connected, such as Wi-Fi networks, cellular networks, and the like, can also be used. The sensors of the telematics device, such as a GPS and/or a compass, can sense the speed and/or direction at which the telematics device (and accordingly vehicle 130) is traveling. An accelerometer of the telematics device can sense the acceleration of the mobile device. A gyroscope can be used to determine the orientation of the mobile device. In some aspects, orientation can be detected, for example, at a rate of 90 Hz. The gyroscope can also be used to measure the speed of rotation of the telematics device. A magnetometer can be used to measure the strength and direction of the magnetic field relative to the telematics device. The data collected by the telematics device can be stored and/or analyzed within the telematics device. Additionally or alternatively, the telematics device can transmit, via a wired or wireless transmission network, the data to one or more computing devices for storage and/or analysis. In a variety of implementations, the telematics device transmits data indicating a route the vehicle or driver has traveled, including multiple points along the route of travel. As explained in more detail below, the locations or location points of the route may include a latitude value, a longitude value, and a sequence value. Other location services and systems may provide alternative or additional information to locate the vehicle or driver along a route or "trip".

Vehicle 130 can further include a short-range communication system. The short-range communication systems can be a vehicle-based data transmission systems configured to transmit vehicle operational data to other nearby vehicles, and to receive vehicle operational data from other nearby vehicles. In some examples, communication system can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. Vehicle-to-vehicle (V2V) transmissions between the short-range communication system can be sent via DSRC, Bluetooth, satellite, GSM infrared, IEEE 802.11, WiMAX, RFID, and/or any suitable wireless communication media, standards, and protocols. In certain systems, the short-range communication system can include specialized hardware installed in vehicle 130 (e.g., transceivers, antennas, etc.), while in other examples the short-range communication system can be implemented using existing vehicle hardware components (e.g., radio and satellite equipment, navigation computers) or can be implemented by software running on a telematics device within (or near) the vehicle 130. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, railroad crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from vehicle 130 to any other vehicle or other infrastructure device capable of receiving the communication within the range of the vehicle's transmission capabilities. For example, vehicle 130 can periodically broadcast (e.g., every 0.1 second, every 0.5 seconds, every second, every 5 seconds, dynamically, etc.) certain vehicle operation data via its short-range communication system, regardless of whether or not any other vehicles or reception devices are in range. In other examples, a short-range vehicle communication system can first detect nearby vehicles and receiving devices and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station which can then relay the information to one or more computing devices.

The types of vehicle operational data, vehicle driving data, breakdown issue data, or the like, transmitted to or from vehicle 130 and/or infrastructure can depend on the protocols and standards used for the V2V or V2I communication, the range of communications, and other factors. In certain examples, vehicle 130 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle 130 is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors potentially can be transmitted via V2V or V2I communication to other nearby vehicles or infrastructure devices receiving V2V or V2I communications from a short-range communication system. Further, additional vehicle driving data not from the vehicle's sensors (e.g., vehicle make/model/year information, driver insurance information, driving route information, vehicle maintenance information, driver scores, etc.) can be collected and transmitted using V2V or V2I communications to nearby vehicles and other receiving devices using the short-range communication system.

The data transferred to and from various devices in operating environment 100 can include secure and sensitive data. Therefore, it can be desirable to protect transmissions of such data using secure network protocols and encryption and to protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many implementations, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the operating environment 100 in front of one or more computing devices describe herein such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
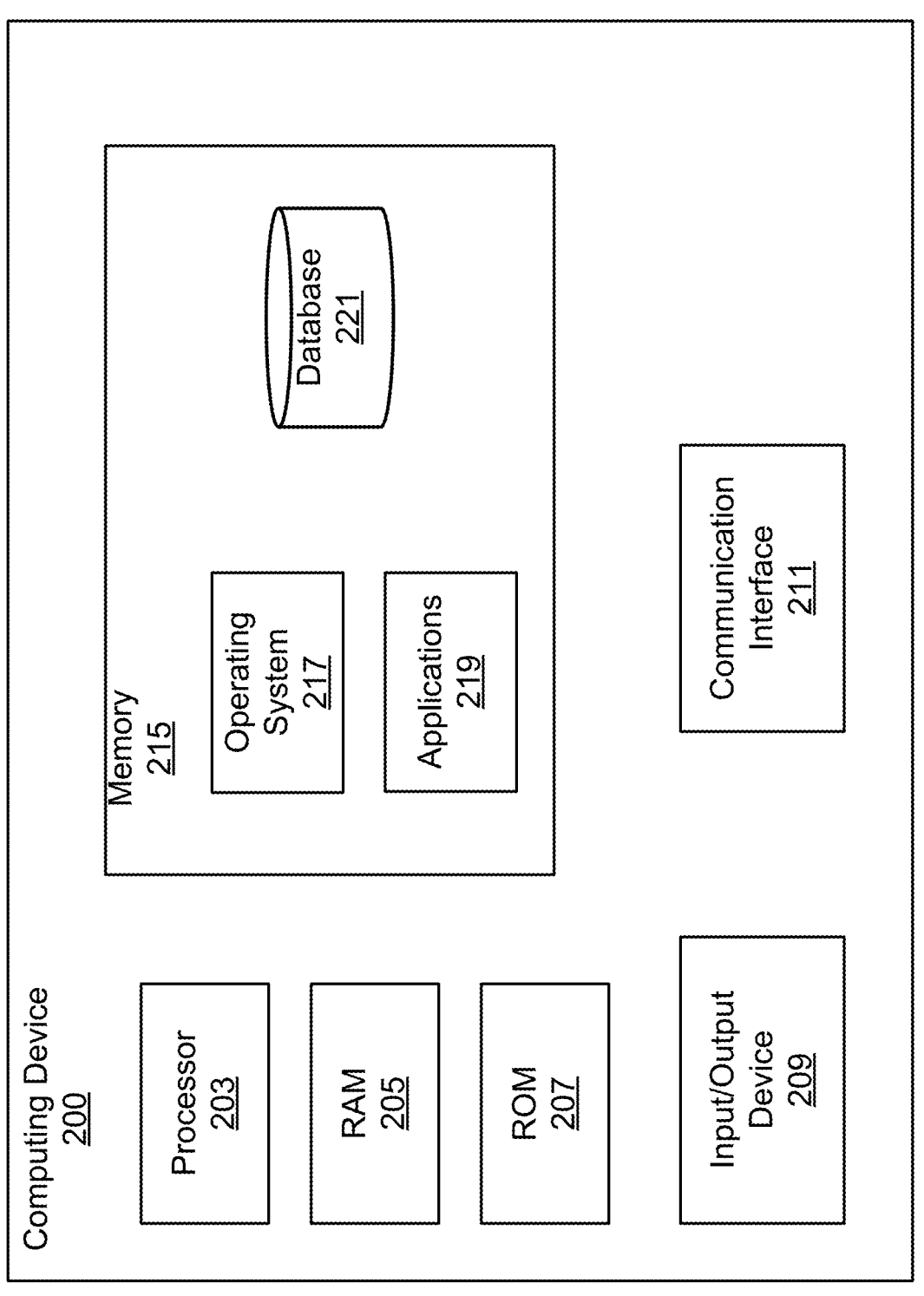
FIG. 2 illustrates one an example computing device that may be used to identify trip similarities from telematics data.

Turning now to FIG. 2, a computing device 200 in accordance with at least one implementation is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable, and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For implementations including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various implementations and can provide potential advantages in certain implementations of software deployment systems, such as faster response times and less dependence on network conditions when transmitting and receiving data.

Although various components of computing device 200 are described separately, functionality of the various components can be combined and/or performed by a single component and/or multiple computing devices in communication.

As mentioned above, it may be beneficial to identify two trips that are "paired", or the same trip taken from a starting location to a destination and back. Such trips may include navigating a vehicle from a user's home to the user's workplace in the morning, followed by returning to the user's home in the evening. Trips to the grocery store and/or the airport and back may also be identified as paired. FIG. 3 is a flowchart illustrating an example method for reorienting location points of a trip to determine trip pairs that may be executed by the systems described above. Identifying trip pairs may aid a vehicle movement processing system in determining round-trip pairs to further understand the navigation of the vehicle by a user or driver. To begin the process of identifying trip pairs, however, the server system 120 may reorient the sequence of location points of one or more trips such that the sequence follows a common direction, regardless of the direction of travel of the vehicle during the trip.

Beginning at step 302, the classification server system 120 may receive information or data associated with a trip taken by the vehicle 130. In general, the vehicle 130 may travel from a starting point to an ending point. During the travel, a GPS or other location service or device integrated into the vehicle 130 and/or client devices 110 may provide periodic location information or data to the server system 120, such as a longitude value, a latitude value, an elevation value, speed, direction, etc. corresponding to a location of the vehicle at points along the trip. This information may be transmitted, by the vehicle 130 and/or client devices 110, to the classification server system 120 via network 140. In one implementation, the location service executed by the vehicle 130 and/or client devices 110 may determine the information or data at a regular period during the trip, such as every 5 seconds or any other duration. Other location services may obtain location information of the vehicle and/or operator of the vehicle at other durations, regularly or irregularly.

Regardless, the classification server system 120 may receive one or more location data points of the vehicle 130 and/or driver during a trip. In one implementation, such information may be sequenced such that each instance of location data may further include a sequence identifier that orients the data within a larger trip. For example, a first instance of location data may include a sequence identifier of "1". A second instance of location data transmitted to the classification server system 120 may include a sequence identifier of "2", and so on. Further, a beginning and/or ending of a trip may be determined from the received location information. For example, the location information may indicate that the location device is stationary for some period of time, followed by a change in location at a speed exceeding a human pace for walking or running. This change is speed and location may indicate the beginning of a new trip. An ending of a trip may be based on a determination that the location device has stopped moving or slowed for another period of time, indicating that the vehicle and/or location device has arrived at a destination and stopped. In still another example, the location device, such as a GPS-enabled client device 110, may receive inputs requesting a suggested route from a starting location to an ending location. These inputs may be transmitted to the server system 120 and used to define a beginning and ending of a trip.

At step 302, the classification server system 120 may receive these location points for a trip. As mentioned, the location points may include a longitude value, a latitude value, and a sequence value, among other data. Thus, a series of location points/values may be collected and transmitted to the classification server system 120 for a trip taken by the vehicle in in progress. As used herein, "location points" may correspond to one or more values identifying a geographic location, such as longitude values, latitude values, or any other value associated with a geographic location. The location points may be identified as belonging to a single trip or route based on many factors, including geographic locations indicated by the data, proximity in time to the collection of the data, an indication from a client device 110 of a single trip (such as requesting a route through the client device to an indicated destination), and the like. In some instances, the location points may be received while the trip is occurring or may be collected at the vehicle 130 or client device 110 and provided to the classification server system 120 after the trip is complete.

At step 304, the server system 120 may commute the obtained longitude value and/or latitude value to be a non-negative number. For example, a longitude value of −87.657713 may be commuted by a value of 180 to ensure that value is a non-negative value. Latitude values may similarly be commuted by a value of 90 to endure a non-negative value. In some instances, however, the longitude values and/or latitude values of the location points may not be commuted to a non-negative number but may instead retain the initial value.

At step 306, the server system 120 may determine if the latitude value of the first location point in the sequence of location points of the received trip is equal to the latitude value of the last location point in the sequence for the received trip. For example, the first location point (as determined by the sequence value associated with the location points of the trip) may include a latitude value of 41.8445628 and the last location point (as determined by the sequence value of the location points) may include a latitude value of 41.7975051. As the latitude values for the first location point and the last location point are not equal, the server system at step 308, may assign a reorientation "start"

label to the start or last location point of the sequence that has the smaller latitude value. In this example, server system 120 may assign the reorientation start label to the last location point as the point, of the two location points being compared, with the smaller latitude value. Alternatively, if the server system 120 determines that the latitude values for the first location point and the last location point are equal, the server system at step 310, may assign a reorientation "start" label to the start or last location point of the sequence that has the largest longitude value. Reorientation of the sequence of location points for the trip is discussed in more detail below.

Selection of the start location point or last location point with the smallest latitude value as the start of the reorientation of the sequence orients the sequence of location points to the southern-most endpoint of the trip. Similarly, selection of the start location or last location with the largest longitude value as the start of the reorientation of the sequence orients the sequence of location points to the eastern-most endpoint of the trip. However, any orientation of the endpoints may be utilized by the server system 120 to reorient a sequence of location points. For example, the server system 120 may be configured to select the northern-most endpoint or the western-most endpoint. In general, any value of the location point may be used to determine the start point of the reoriented sequence of location points.

The reorientation start label assigned to the first location point or the last location point may be any value appended or otherwise associated with the selected location point. For example, the start label may comprise one or more alphanumeric characters indicating the location point as the start of the reoriented sequence, such as "ORIENT_POINT", "START", "ORIENT_BEGIN", and the like. In another example, the start label may comprise a numeric value, such as "0", "0001", and the like that indicates the selected location point as the beginning of the reoriented sequence. The start label may also be stored with or otherwise associated with the selected location point as stored by the server system 120. In some instances, the server system 120 may generate a duplicate sequence of location points for the received trip for reorientation, including assigning the start label or any other alteration to the sequence of location points, such that the original sequence of location points may be stored as received from the vehicle 130.

At step 312, the server system 120 may assign an "end" label to the endpoint (first location point or last location point of the sequence of the received trip) that is not selected as the start of the reorientation sequence. For example, if the last location point for the sequence is selected as the start of the reoriented sequence, the server system 120 may assign the end label to the first location point in the sequence. Similar to the start label, the end label may be any value appended or otherwise associated with the location endpoint. For example, the end label may comprise one or more alphanumeric characters indicating the location point as the end of the reoriented sequence, such as "NORIENT_POINT", "ORIENT_POINT", and the like. In another example, the start label may comprise a numeric value, such as "9999999" that indicates the selected location point as the ending of the reoriented sequence. Also similar to above, the end label may be stored with or otherwise associated with the location endpoint not selected as stored by the server system 120 or in the duplicate list of location points for the trip.

At step 314, the server system 120 may generate a reoriented sequence of location points for the trip based on the start and end labels assigned to the endpoints of the sequence. For example, if the first location point for the trip is assigned as the start of the sequence, the server system 120 may generate a reoriented sequence or "resequencing" of location points for the received trip that starts at the first location point and ends at the last location point. In another example, if the last location point for the trip is assigned as the start of the sequence, the server system 120 may generate a reoriented sequence or resequencing of location points for the received trip that starts at the last location point and ends at the first location point, providing a reverse sequence of the received location points for the trip. In this manner, the sequence for the trip may be reoriented to start at a designated location as determined by the server system 120. As the designated starting location is common to trips that may be a pair, the generated reoriented sequences of location points may be the same for the trips, as described in more detail below.

Figure 4:
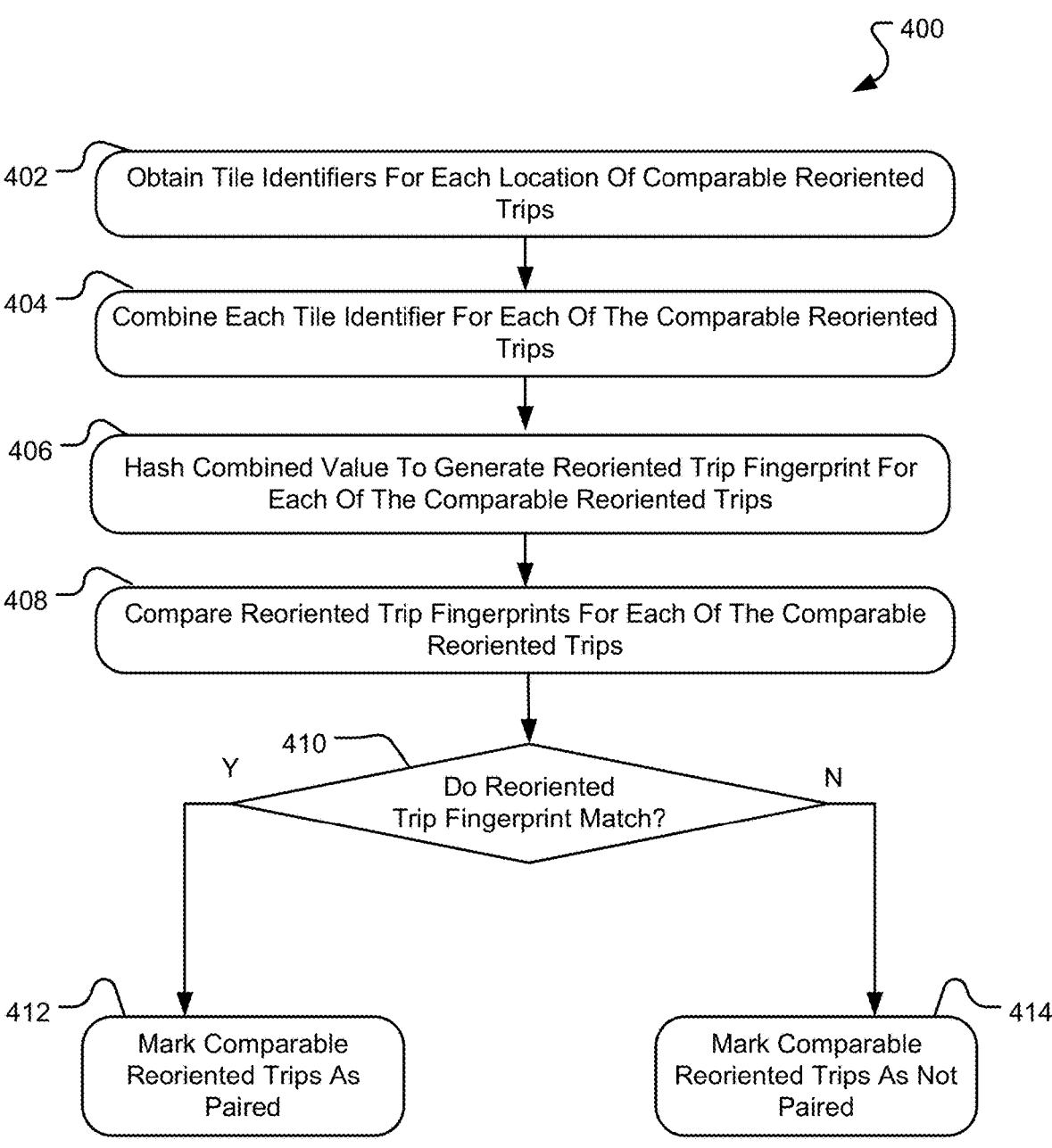
FIG. 4 is a flowchart illustrating an example method for determining fingerprint values for a plurality of trips to determine trip pairs.

Once the sequence for two or more trips are resequenced through the method above, the server system 120 may identify if two or more of the trips are paired. In particular, FIG. 4 is a flowchart illustrating an example method 400 for determining fingerprint values for a plurality of trips to determine trip pairs. The operations of the method 400 may be performed or executed by the server system 120, the user device 110, one or more computing devices of a vehicle 130, or any combination of the devices of operating environment 100 of FIG. 1. In one implementation, the server system 120 may perform the method 400 to determine if a newly received trip is paired to a previous trip taken by a vehicle, a driver of the vehicle, or other vehicles or drivers. For example, the server system 120 may identify a received trip as paired to a trip the same vehicle traversed at an earlier time but in the opposite direction, such as a user's drive from home to work and then back home. The server system 120 may process the data associated with the received trip that is paired to a previous trip differently based on an identification of the trips being paired, such as averaging the data corresponding to paired trips, discarding trip information for one or both of the paired trips, determining a movement pattern for the vehicle corresponding to the paired trips, and the like.

Beginning at operation 402, the server system 120 may obtain one or more tile identifiers for each of the oriented location points of the reoriented trips generated through the method 300 of FIG. 3. In general, one or more tile identifiers may be associated with each location point of the reoriented trips being compared to determine if paired. As described above, the sequence of location points for the comparable trips are reoriented around a start and/or end label assigned to the endpoints of a received trip. To obtain a tile identifier for each of the location points of a reoriented trip, the server system 120 may first associate each of the location points of the reoriented trip with a tile. One method 500 for associating a tile with the location points of the reoriented trip is illustrated in FIG. 5. Through the method 500, the server system 120 may identify a unique tile from a plurality of tiles corresponding to geographic locations that corresponds to the location points of the reoriented trip.

Figures 6A, 6B, 6C, 6D:
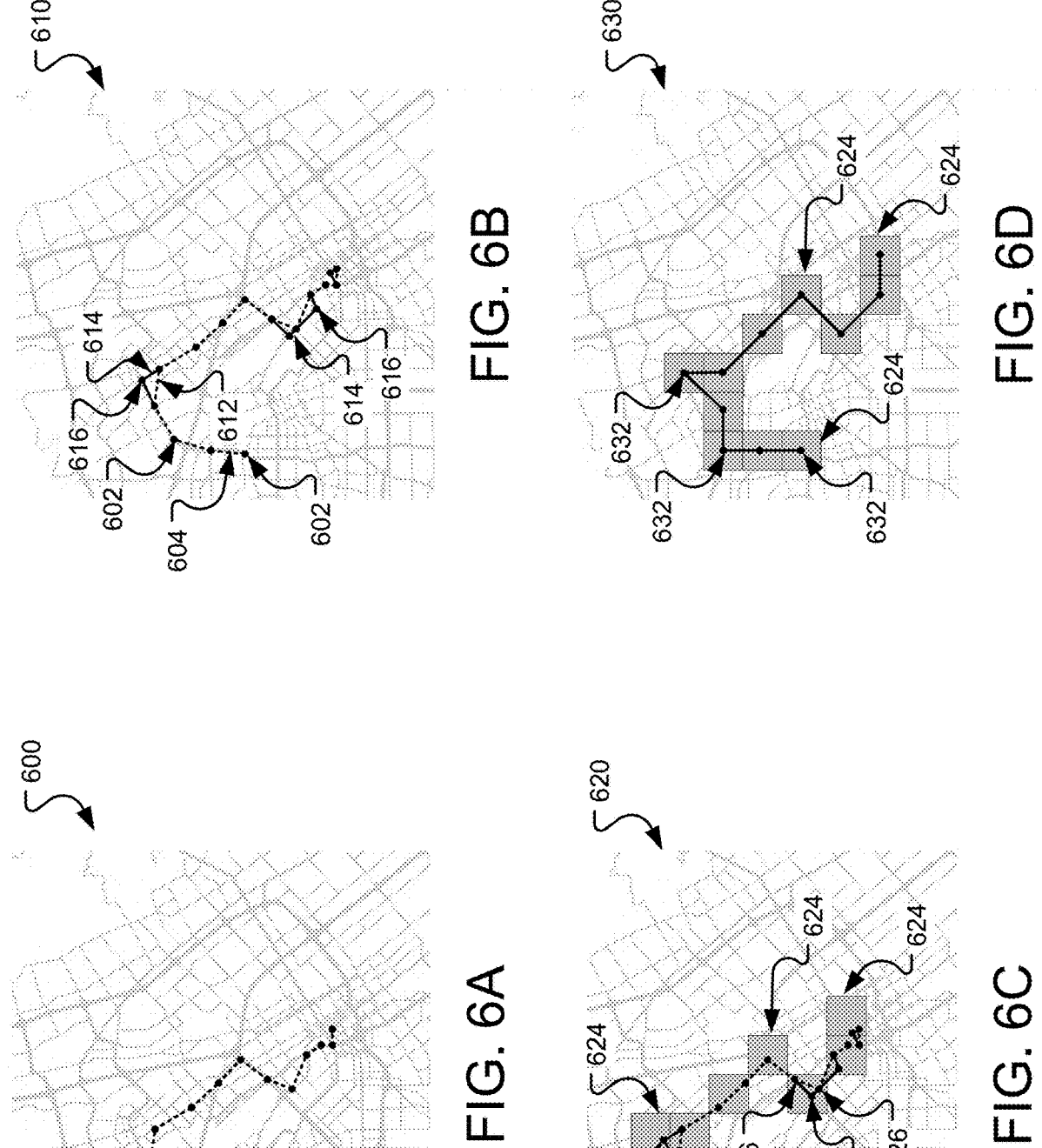
FIGS. 6A-6D depict a series of geographic maps with a route of a trip and determined tiles corresponding to the route identified through the method of FIG. 5.

As discussed above, the reoriented location points of a reoriented trip may be transmitted to the server system 120. Thus, at step 502, the classification server system 120 may receive the location points of a reoriented trip, such as after the location points have been reoriented around the start and end labels. At step 504, the server system 120 may associate one or more of the received location points on a geographic map. For example, FIG. 6A illustrates an example geographic map 600 with located received location points 602 of a trip identified within the map. The geographic map 600 may therefore be sized to accommodate each of the received location points 602 for a trip, based on a latitude/longitude value of each location or any other geographic location information. In one instance, the geographic map 600 may include known roads, landmarks, businesses, addresses, traffic rules, current and historic traffic patterns, status of the known roads, other types of transportation systems (bus routes, train tracks, light rail tracks, etc.), and the like. The information within the geographic map 600 may be obtained from a database of geographic information, maintained by or otherwise associated with the server system 120 or from a third-party database of geographic information. In some instances, the server system 120 may not locate with received location points 602 into a visual geographic map such as that illustrated in FIG. 6A. Rather, the geographic information obtained from the geographic database may be indexed by any location information, such as a latitude value and/or a longitude value. Comparison of the received location points 602 to the geographic information in the database may be executed by determining a difference between the location information of the received location points and the location information of the geographic database such that no visual representation of the geographic map is generated. In some instances, a visual representation of the received location points 602 of the trip in a geographic map 600 may be generated to aid a user of the server system 120 in visualizing the parameters of the trip. Such visual maps are used herein for example purposes only and should not be construed as limiting the methods and systems described herein.

As shown in the geographic map 600 of FIG. 6A, each received location point 602 may be located within the map. As the received location points 602 may include a sequencing value or start or end label, the server system 120 may also determine a starting point and an ending point for the reoriented trip. Further, the server system 120 may connect the location points 602 with a straight line 604 in the geographic map 600 to generate an initial path based on the location points. The initial path may be generated independent of the known roads or other geographic information obtained for the geographic map 600.

At step 506, the server system 120 may remove corner cutting from the connected location points 602 based on the road, landmark, and other information included in the geographic map 600. For example, FIG. 6B illustrates an example geographic map 610 with located received location points 602 of a trip identified within the map, connecting lines 604 between the location points, and added location points 616 to account for corner cutting along the received location points. The geographic map 610 may define the same geographic area as the map 600 described above with relation to FIG. 6A, including the received location points 602 of the trip and the connections 604 between the points. The server system 120 may change, amend, or otherwise alter the connected location points 602 to correspond to road or other information associated with the geographic map 610. For example, a comparison of the connected location points 602 to the locations of roads within the geographic map 610 may indicate that a connection between two points (such as connection 612) traverses a path that does not correspond to a known road. Rather, because the connections 604 between the locations 602 are assumed to be straight lines in the initial route, some connections may bisect a corner defined by the roads of the map 610. Such a circumstance may occur if a vehicle travels to and turns at an intersection between collection of the vehicle's location.

The comparison of the connected points 602 to the road information of the geographic map 610 may indicate such a cut corner. The server system 102 may, in response, add one or more connecting lines 614 to the determined path that follows an assumed path of the vehicle along the roads, adding the corner route into the vehicle path. In addition to the added corner paths 614, the server system 120 may, at step 308, also add a new location point 616 at the inflection point of the added corner paths 614. The server system 120 may treat these added inflection points 616 in a similar manner as a received location point. For example, the server system 120 may generate location information (such as a latitude value and/or a longitude value) and a sequence value for the added inflection point 616. This information may be inserted into add into a list of location points 616 for the trip based on the generated sequence value for the determined inflection point 616. The server system 120 may insert any number of inflection points 616 into the list of location points 602 for the trip based on the road information of the geographic map 610. The server system 120 may therefore generate an idealized collection of location points from the inflection points 616 and the connected location points 602. In one implementation, the server system 120 may apply one or more smoothing techniques to the connected location points 602 to remove anomalies within the received location data. The smoothed connections 604 between the location points 602 may be included in the idealized route for the trip.

At step 510, the server system 120 may identify one or more tiles corresponding to the location points 602, 616 of the idealized route for the trip. For example, the server system 120 may generate and/or maintain tiling information corresponding to each location within a geographic region, such as a city, a state, a country, or the entire world. The tiling information may comprise a plurality of individual tiles of a square or rectangular shape that each correspond to an area of the covered geographic region. In one implementation, the edges of each tile may be defined by a latitude value or a longitude value, such that all geographic locations within the defined edges may be considered as belonging to that particular tile. In this manner, every geographic location within the covered geographic region may be associated with a tile. Further, each tile in the plurality of tiles may be associated with a unique tile identifier comprising any value, such as a numerical value or an alphanumeric identifier.

As shown in the geographic map 620 of FIG. 6C, each of the location points 622 of the idealized trip route may be associated with a corresponding tile 624 from the plurality of tiles. In particular, the server system 120 may determine a geographic location (such as a latitude value and a longitude value) for each of the location points 622 of the idealized route. A tile 624 that contains each of the determine geographic locations of the location points 622 may then be identified by the server system 120. In one implementation, the server system 120 may obtain a list of the tile identifiers for the corresponding tiles 624. In some instances, more than one location point 622 may be located within an identified tile 624. The server system 120 may, in such circumstances, identify the tile 624 corresponding to the multiple location points 622, but only include one instance of the tile identifier in a list of trip route tile identifiers.

In addition, the server system 120 may identify a tile granularity value that corresponds to a size of the tiles identified for the idealized trip route, also referred to as a tile level value. A tile level value may be associated with a geographic distance of one or more of the edges of the tiles applied to the idealized trip route. For example, a level 1 tile may include an edge corresponding to 1 kilometer (km) in distance in the geographic map 620, such that a level 1 tile with equal 1 km edges may cover a 2 km² geographic area. In another example, a level 30 tile may include edges corresponding to centimeters of distance, covering a few centimeters squared area of the geographic area. In general, the edges of the tiles may be any distance and may be selected by the server system 120 to increase or decrease the granularity of the identified tiles included in the list of tile identifiers associated with the idealized trip route. The level of the identified tiles, in addition to the latitude value and/or longitude value, may be determined by the server system 120 at step 510.

At step 512, the server system 120 may adjust the idealized location points for the trip to a centroid location 632 within the identified tiles 624, as illustrated in the map 630 of FIG. 6D. In some instances, multiple location points 622 of the trip may be located within a single tile, such as idealized location points 626 of FIG. 6C. Adjusting the idealized points 622 for the trip to a centroid location 632 may include combining those locations within the trip into a single location corresponding to a centroid location within the tile area. In other instances, however, the server system 120 may retain all idealized location points 622 of the trip with or without adjusting the location to a centroid 632 of the identified tiles 624 of the trip. Through the method 500 of FIG. 5, the server system 120 may identify a unique tile from a plurality of tiles corresponding to geographic locations associated with the location points of the reoriented trip.

Each of the identified tiles may be associated with a unique identifier such that the server system 120 may obtain a list of the unique identifiers for the tiles of the reoriented trip. The tile identifier for each tile 424 may be generated through any technique for generating a unique value. One particular example of a method for generating a unique identifier for a tile 424 is described in co-filed U.S. patent application Ser. No. 17/828,654, titled SYSTEM AND METHOD FOR IDENTIFYING TRIP SIMILARITIES, now U.S. Pat. No. 12,072,197, the entirety of which is incorporated by reference herein. Regardless of the method employed, each of the identified tiles may be associated with a unique identifier such that a string of the unique identifiers may be determined corresponding to the sequence of location points of the reoriented trip.

Returning to the method 400 of FIG. 4, the server system 120 may combine each of the tile identifiers into a reoriented trip tile value at step 404. Combining the trip tile identifiers may include any technique to combine a plurality of integer values, including taking the average of the integer values, adding the integer values, determining a mean of the integer values, and the like. In one particular example, the tile identifiers may be 64-bit integer values and combining the identifiers may include adding the 64-bit values for each tile of the trip together to calculate the combined tile identifiers value. At step 406, the server system 120 may execute a hashing function on the combined tile identifiers value to obtain a reoriented trip fingerprint or identifier. In general, the server system 120 may utilize any known or hereafter developed hashing technique to convert the combined tile identifiers value to the reoriented trip fingerprint. In one particular implementation, the hashing technique may be repeatable such that a reoriented trip fingerprint value may be the same given the same input tile identifier values. In other implementations, other types of conversion techniques may be utilized to convert the combined tile identifiers into a reoriented trip fingerprint. Regardless of the techniques utilized, a reoriented trip fingerprint may be generated from the tile identifiers associated with a reoriented trip.

To determine if a reoriented trip is paired to another reoriented trip, the server system 120 may, at step 408, compare the generate trip fingerprint for each of the comparable reoriented trips to determine if the fingerprint values of the trips match. In general, the server system 120 may maintain or otherwise be in communication with a database of fingerprints or reoriented trips that have been previously calculated or determined. In one example, the server system 120 may store fingerprints of reoriented trips for individual users or vehicles such that each fingerprint may be associated with a particular user identifier. Thus, the server system 120 may compare a first reoriented trip identifier to other reoriented trip identifiers associated with the same user, vehicle, location device, computing device, etc.

At step 410, the server system 120 may determine if the calculated reoriented trip fingerprint of a first trip matches a reoriented trip fingerprint in the database. If the calculated reoriented trip fingerprint matches a reoriented trip fingerprint in the database, the server system 120 may, at step 412, generate an indication that the two trips comprise a trip pair. In one implementation, the server system 120 may store the two paired trips with some type of indication of the pairing. For example, the trip pair may be stored with a pointer that points to the other trip in the determined pair. Alternatively, if the server system 120 determines that the reoriented trip fingerprint does not match a stored reoriented fingerprint from the database, the system may, at step 414, mark the compared trips as not paired. The method 400 may FIG. 4 may be repeated for any number of trips associated with a vehicle or user to identify if any of the stored trips are paired with a newly received trip. The determination that two received trips are paired (based on the orientation of the sequence of location points) may aid the server system 120 in processing the trips together as a single trip or two halves a related trip, thereby improving the accuracy and efficiency of the classification server system. In addition, the fingerprinting of vehicle trips for comparison allows the classification server system to compare an in-progress vehicle trip in real time to hundreds or thousands of stored vehicle trips in a fast and accurate manner to classify the in-progress vehicle trip as related to a stored trip.

In many instances, it may be useful to identify trips that are similar to a newly received trip and determine a value of a relative similarity between the trips. For example, a new trip may be received at the server system 120, including a sequence of location points defining the trip. The server system 120 may use the location point information to determine tile identifiers associated with the location points, as described above. The tile identifier sequence of the trip may then be compared to other tile identifier sequences of other trips either taken by the same vehicle or user or other vehicles or users. A similarity value may be calculated that indicates a level of sameness between the target trip and any number of stored trips. In this manner, similar trips of a vehicle or vehicles may be identified without requiring a direct comparison between the various location points for the trips. Such a comparison using tile identifiers may increase the speed and efficiency of the server system 120 to determine trips that are similar to a target trip. The identification of the similar trips may aid the server system 120 in a variety of ways, such as targeted advertising based on common trips (even though not identical), identification of users that travel along similar routes for carpooling and/or advertising purposes, determination of changes in preferred routes for a vehicle or fleet of vehicles, and the like.

FIG. 7 is a flowchart illustrating an example method 700 for calculating a relational similarity value between two or more trips based on tile identifiers associated with location points of the two or more trips. The steps of the method 700 may be performed or executed by the server system 120, the user device 110, one or more computing devices of a vehicle 130, or any combination of the devices of operating environment 100 of FIG. 1. The steps may be performed to classify or correct one or more trips received at the vehicle 130, user device 110, or server system 120 based on an identification of a similar previous trip.

At step 702, tile identifiers for a received trip may be obtained. The tile identifiers may be unique identifiers correlated to the location points associated with the trip, as discussed above with reference to FIGS. 5-6B. As the trip may include several location points in a particular order based on the sequence number associated with each location point, the obtained tile identifiers may be included in a string of identifiers that defines or is otherwise associated with the trip. At step 704, the order of the sequenced tile identifiers for the trip may be reversed to generate a sequence of tile identifiers for a reverse of the received trip. The sequence of tile identifiers for the trip and the sequence of tile identifiers for the reversed trip may be stored in a data store, such as by the server system 120 of FIG. 1.

At step 706, the sequence of tile identifiers for any number of previously received and stored trips may be obtained. For example, the server system 120 may receive location points associated with previous trips taken by a vehicle, determine one or more unique tile identifiers associated with those location points, and store the sequence or strand of tile identifiers in a database. The sequence of tile identifiers may be also be stored with an identifier of the trip, (such as a classification as a type of trip, a unique trip identifier, a group of similar trips, etc.), an identifier of a user of the server system 120, an identifier of a vehicle associated with the trip, or any other information corresponding to the stored trip. In general, the server system 120 may store any number of tile identifiers for any number of trips and may, in some instances, use the sequence of tile identifiers of the stored trips to identify similar trips. For comparison to a newly received trip, any number of such sequences of previous trips may be obtained, such as some or all trips taken by the vehicle received in the previous timeframe (such as every trip received and stored from last week, the last month, or the last year), some or all trips associated with a user of the server system 120, some or all trips received at the server system over a time period regardless of the user or vehicle associated with the trips, and the like.

At step 708, a computing device (such as the server system 120) may calculate a similarity distance value of the sequence of tile identifiers of the newly received trip to the sequence of tile identifiers to each of the stored previous trips. In general, any technique or process may be executed by the computing device to calculate the similarity distance value. In one particular example, the technique for calculating the similarity distance value may include a Levenshtein Distance Technique that provides a string metric for measuring the distance between two sequences. The similarity distance value technique provides a value corresponding to the similarity between sequences of letters or numbers. In this implementation, the similarity distance value technique is a computation that compares the sequence of tile identifiers of the newly received trip to the sequence of tile identifiers for any number of stored trips and outputs a "difference" value (also referred to as a "similarity distance value") corresponding to a calculated difference between the compared sequences, or how close the two sequences are in similarity. Further, the computing device may calculate a similarity distance value of the sequence of tile identifiers of the reverse of the newly received trip to the sequence of tile identifiers to each of the stored previous trips. As such, a similarity distance value may be obtained from a comparison of the newly received trip to the stored trips and a comparison of a reverse of the newly received trip to the stored trips.

At step 710, a computing device (such as the server system 120) may calculate a longest common subsequence (LCS) value of the sequence of tile identifiers of the newly received trip to the sequence of tile identifiers to each of the stored previous trips. In general, a LCS technique determines the longest subsequence within a longer sequence that is shared or similar to another sequence. In many techniques, the digits or values included in the common subsequence of the longer sequences do not need to contiguous in the sequence. For example, the two sequences (ABCD) and (ACBAD) have 5 2-length common subsequences: (AB), (AC), (AD), (BD), and (CD); and 2 3-length common subsequences: (ABD) and (ACD). So (ABD) and (ACD) are their longest non-contiguous, common subsequences. Many LCS techniques may ascribe a value to the similarity calculations. For example, a technique applied to the sequence above may return a value of two (indicating that the sequences have 2 3-length common subsequences), may return a value indicating a length of the common subsequence and a number of occurrences, or may return any other calculated value arising from the comparison of the subsequences common to the sequences. Thus, the LCS value provides an indication of the similarity between sequences of letters or numbers. In this implementation, the LCS technique is a computation that compares the sequence of tile identifiers of the newly received trip to the sequence of tile identifiers for any number of stored trips and outputs an "LCS" value corresponding to a calculated similarity distance value between the compared sequences. Further, the computing device may also calculate an LCS value of the sequence of tile identifiers of the reverse of the newly received trip to the sequence of tile identifiers to each of the stored previous trips. As such, an LCS similarity distance value may be obtained from a comparison of the newly received trip to the stored trips and a comparison of a reverse of the newly received trip to the stored trips.

At step 712, the similarity distance value and the LCS value of the comparison of the tile identifiers of the received trip to a sequence of a previously stored trip may be combined to generate a trip relational value indicative or otherwise corresponding to the similarities of the compared trips. In one implementation, the similarity distance value and the LCS value may be converted to a common format prior to combining the values. For example, the LCS value may comprise a vector or set of values corresponding to the common subsequence while the similarity distance value may be a number. In such instances, either the LCS value or the similarity distance value may be converted into a format such that the two values can be combined. Further, the similarity distance value and the LCS value for each comparison of the received trip to the stored, previously received trips may be calculated and stored. Thus, a first combined similarity distance value and the LCS value may be determined for the new trip to a first stored trip, a second combined similarity distance value and the LCS value may be determined for the new trip to a second stored trip, and so on. Also, a combined similarity distance value and the LCS value may be determined for a comparison of the reverse of the received trip to each of the stored, previously received trips. The combined similarity distance value and the LCS value for each comparison may be stored in a database for conversion and display on a computing device.

At step 714, each of the relational values calculated from the comparison of the received trip and reverse of the received trip to the stored trips may be converted to a common similarity scale. In one example, the relational values may be converted to an integer value between 0 and 9. However, the relational values may be converted to any scale of numbers. The conversion of the relational values may be executed for ease of processing by the server system 120 or other computing device or for understanding by a user of the system. In some instances, the trip relational values may not be converted to the common scale. At step 716, the converted or non-converted trip relational values may be returned to a computing device, such as a display device of the server system 120, a mobile phone, PDA, tablet computer, laptop computer, smartwatch, of any other computing device for processing. The converted trip relational values, therefore, provide a calculated indicator of a similarity between a received trip and a reverse of the received trip to any number of previously stored trips. This comparison may accurately and efficiently determine the similarities of an in-progress vehicle trip in real time to hundreds or thousands of stored vehicle trips to determine which stored trips are similar and how similar the stored trips are to the in-progress vehicle trip.

Figure 8:
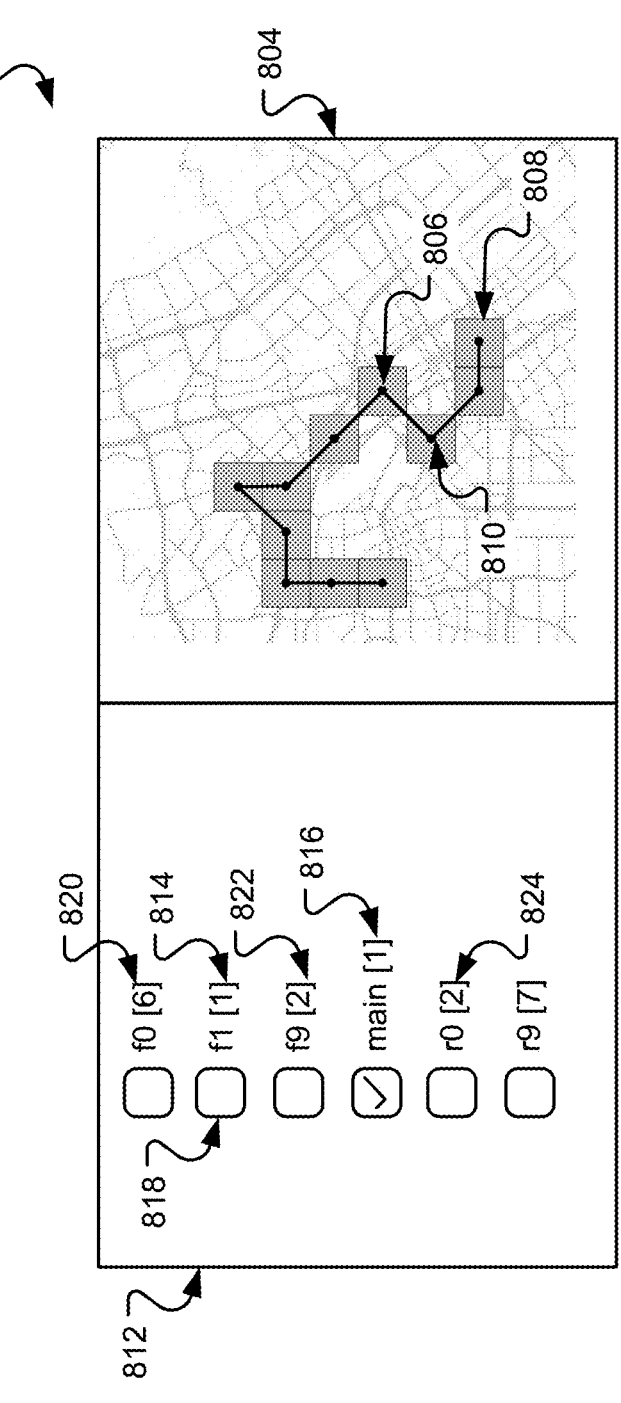
FIG. 8 depicts a user interface displaying calculated relational similarities between trips.

In one instance, the returned converted trip relational values may be displayed on a display device for understanding by a computing device or user. FIG. 8 depicts a user interface 802 displaying calculated relational similarities between trips. In some instances, the user interface 802 may be displayed on a display of a computing device, such as a mobile phone, a laptop computer, a desktop computer, and the like. In general, the user interface 802 may include a map portion 804 that illustrates a received route 806 or other stored route, including the location points 810 (or adjusted location points) of the received or stored route, and one or more identified tiles 808 associated with the location points. More or less information may be displayed in the map portion 804, including map features such as roads, rivers, train tracks, and the like for a particular region in which the displayed route occurred. The user interface 802 may also include a portion 812 illustrating information of routes similar to the illustrated route 806. For example, the similar route portion 812 may include a listing of a number routes stored by the server system 120 determined to be similar to the selected route through the process described above with relation to FIG. 7. As shown, the listing may include an entry 816 for the newly received route that is compared to the other routes stored by the server system 120, indicated as the "main" route that is compared to other routes stored by the system. The similar route portion 812 may include one or more check boxes 818 for selection. When selected, the corresponding route may be displayed in the map portion 804 of the user display 802. For example, the check box next to the main route 816 is selected in the user display 802 such that the main route is illustrated in the map portion 804. Selection of other checked boxes 818 may cause other similar routes to be illustrated in the map portion 804 of the user display 802.

The similar route portion 812 of the user display 802 includes a listing of several similar routes to the main route 816. In particular and as described above, a computing device may determine a converted trip relational value indicating a similarity of one or more routes to the main route. The results of the comparison of the main route to other routes is displayed in the user interface 802. In particular, the computing device may determine the number of routes that have the same converted trip relational value to the main trip. For example, the portion 812 of the user interface 802 includes an entry "f1 [1]" 814. This entry illustrates that one trip in the same direction ("forward") as the main trip having a converted trip relational value of "1" has been determined through the similarity comparison described above. Another entry 820 illustrates that six trips in the same direction ("forward") as the main trip having a converted trip relational value of "0" has been determined through the similarity comparison. In one instance, a lower converted trip relational value corresponds to a more similar trip. Thus, the entry 820 indicates that six trips stored by the server system 120 were identified as identical to the main trip, while entry 814 indicates that one trip was similar to the main trip, but not identical. Another entry 822 indicates that two trips have been identified as having a converted trip relational value of nine, indicating the two trips are mostly unrelated to the main trip 816.

As described above, the reverse of the main trip may also be compared to the stored trips through the method 700 of FIG. 7 described above. Thus, the user interface 802, and more particularly the similar route portion 812, may include one or more entries indicating a number of stored trips that are similar to the reverse of the main trip. In the example illustrated in FIG. 8, the computing device may determine that two stored routes are similar to or identical to the main route through the calculation of a zero converted trip relational value. This may be indicated in the user interface 802 through the entry r0 [2], with the "r" indicating a comparison to a reverse of the main trip, the value "0" correlating to the calculated converted trip relational value, and [2] indicating two stored trips were identified with the calculated converted trip relational value of zero for the reverse of the main trip. This information indicates that two stored trips are identical or very similar to the reverse of the main trip. The entry r9 [7], on the other hand, indicates that seven stored trips were found that are somewhat similar to the reverse of the main trip, but far less similar than routes with a calculated converted trip relational value of zero. Selection of the check box 818 next to any of the entries in the similar route portion 812 of the user interface 802 may cause the routes corresponding to the entry to be displayed in the map portion 804, among other information.

Through the method 700 of FIG. 7 and the user interface of FIG. 8, stored routes that are similar to a newly received or main trip may be identified. Further, a value corresponding to a level of similarity between the routes may be calculated and displayed, along with a map of the similar routes, other routes with the same calculated converted trip relational value, and any other information stored by the server system 120. In a similar manner, a value corresponding to a level of similarity between one or more stored routes and a reverse of the main trip may be calculated and displayed. Identification of similar trips, and identification of a level of similarity between trips, may aid the server system 120 in processing trips for any number of reasons, such as directed advertisements, rebates based on driving habits, correlating drivers of similar routes, and dispatching of emergency vehicles, among many other examples.

Implementations of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an implementation in the present disclosure can be references to the same implementation or any implementation; and, such references mean at least one of the implementations.

Reference to "one implementation" or "an implementation" means that a particular feature, structure, or characteristic described in connection with the implementation is included in at least one implementation of the disclosure. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various implementations given in this specification.

Without intent to limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

I claim:

1. A method for pairing vehicle trips, the method comprising:

obtaining, by a classification system and from a location device associated with a vehicle, a plurality of location values associated with a vehicle trip, each of the plurality of location values comprising at least two geographic values and a sequence value, wherein the at least two geographic values comprise a latitude value and a longitude value;

associating a reorientation start label to one of the plurality of location values based on the latitude value associated with the one of the plurality of location values, wherein associating the reorientation start label to the one of the plurality of location values based on the latitude value associated with the one of the plurality of location values comprises:

determining whether the latitude value of a first location point of the vehicle trip is equal to the latitude value of a last location point of the vehicle trip;

following a determination that the latitude value of the first location point of the vehicle trip is not equal to the latitude value of the last location point of the vehicle trip:

determining which of the first location point of the vehicle trip or the last location point of the vehicle trip has a smaller latitude value; and associating the reorientation start label to the first location point of the vehicle trip when the first location point of the vehicle trip is determined to have the smaller latitude value, or associating the reorientation start label to the last location point of the vehicle trip when the last location point of the vehicle trip is determined to have the smaller latitude value;

following a determination that the latitude value of the first location point of the vehicle trip is equal to the latitude value of the last location point of the vehicle trip:

determining which of the first location point of the vehicle trip or the last location point of the vehicle trip has a larger longitude value; and associating the reorientation start label to the first location point of the vehicle trip when the first location point of the vehicle trip is determined to have the larger longitude value, or associating the reorientation start label to the last location point of the vehicle trip when the last location point of the vehicle trip is determined to have the larger longitude value;

resequencing the plurality of location values based on the reorientation start label;

deriving, from a plurality of geographic tile identifiers each associated with at least one of the resequenced plurality of location values, a pairing fingerprint value for the vehicle trip; and pairing the vehicle trip to at least one previous vehicle trip based a comparison of the pairing fingerprint value for the vehicle trip to a database of fingerprint values of previous trips.

2. The method of claim 1, further comprising:

associating a reorientation end label to one of either the first location point of the vehicle trip or the last location point of the vehicle trip that was not associated with the reorientation start label, the resequencing of the plurality of location values further based on the reorientation end label.

3. The method of claim 1 wherein pairing the vehicle trip to the at least one previous vehicle trip is based on the pairing fingerprint value for the vehicle trip matching a fingerprint value of the at least one previous vehicle trip.

4. The method of claim 1, further comprising:

identifying, from a database of geographic tile identifiers and based on the plurality of location values, the plurality of geographic tile identifiers each defining a geographic region.

5. The method of claim 4, further comprising:

combining the plurality of geographic tile identifiers; and executing a hashing technique on the combined plurality of geographic tile identifiers to derive the pairing fingerprint value for the vehicle trip.

6. The method of claim 1 wherein the location device is a Global Positioning System (GPS)-enabled device.

7. A system for pairing vehicle trip, the system comprising:

a communication interface receiving a plurality of location values associated with a vehicle trip, each of the plurality of location values comprising at least two geographic values and a sequence value and determined by a location device associated with a vehicle, wherein the at least two geographic values comprise a latitude value and a longitude value;

a processing device; and a non-transitory computer-readable medium encoded with instructions, which when executed by the processing device, cause the processing device to:

assign a reorientation start label to one of the plurality of location values based on the latitude value associated with the one of the plurality of location values, wherein, to assign the reorientation start label to the one of the plurality of location values based on the latitude value associated with the one of the plurality of location values, the instructions, when executed by the processing device, cause the processing device to:

determine whether the latitude value of a first location point of the vehicle trip is equal to the latitude value of a last location point of the vehicle trip;

following a determination that the latitude value of the first location point of the vehicle trip is not equal to the latitude value of the last location point of the vehicle trip:

determine which of the first location point of the vehicle trip or the last location point of the vehicle trip has a smaller latitude value; and assign the reorientation start label to the first location point of the vehicle trip when the first location point of the vehicle trip is determined to have the smaller latitude value, or assign the reorientation start label to the last location point of the vehicle trip when the last location point of the vehicle trip is determined to have the smaller latitude value;

following a determination that the latitude value of the first location point of the vehicle trip is equal to the latitude value of the last location point of the vehicle trip:

determine which of the first location point of the vehicle trip or the last location point of the vehicle trip has a larger longitude value; and assign the reorientation start label to the first location point of the vehicle trip when the first location point of the vehicle trip is determined to have the larger longitude value, or assign the reorientation start label to the last location point of the vehicle trip when the last location point of the vehicle trip is determined to have the larger longitude value;

resequence the plurality of location values based on the reorientation start label;

determine, from a plurality of geographic tile identifiers each associated with at least one of the resequenced plurality of location values, a pairing fingerprint value for the vehicle trip; and pair the vehicle trip to at least one previous vehicle trip based on a comparison of the pairing fingerprint value for the vehicle trip to a database of fingerprint values of previous trips.

8. The system of claim 7 wherein the location device is a mobile device associated with a driver of the vehicle.

9. The system of claim 7 wherein the location device is a telematics device associated with the vehicle.

10. The system of claim 7, wherein the instructions further cause the processing device to:

assign a reorientation end label to one of either the first location point of the vehicle trip or the last location point of the vehicle trip that was not assigned the reorientation start label, the resequencing of the plurality of location values further based on the reorientation end label.

11. A non-transitory, computer-readable medium storing instructions that, when executed by one or more processors, cause the one or more processors to perform the operations of:

obtaining, from a location device associated with a vehicle, a plurality of location values associated with a vehicle trip, each of the plurality of location values comprising at least two geographic values and a sequence value, wherein the at least two geographic values comprise a latitude value and a longitude value;

associating a reorientation start label to one of the plurality of location values based on the latitude value associated with the one of the plurality of location values, wherein associating the reorientation start label to the one of the plurality of location values based on the latitude value associated with the one of the plurality of location values comprises:

determining whether the latitude value of a first location point of the vehicle trip is equal to the latitude value of a last location point of the vehicle trip;

following a determination that the latitude value of the first location point of the vehicle trip is not equal to the latitude value of the last location point of the vehicle trip, trip:

determining which of the first location point of the vehicle trip or the last location point of the vehicle trip has a smaller latitude value; and associating the reorientation start label to the first location point of the vehicle trip when the first location point of the vehicle trip is determined to have the smaller latitude value, or associating the reorientation start label to the last location point of the vehicle trip when the last location point of the vehicle trip is determined to have the smaller latitude value;

following a determination that the latitude value of the first location point of the vehicle trip is equal to the latitude value of the last location point of the vehicle trip:

determining which of the first location point of the
vehicle trip or the last location point of the vehicle
trip has a larger longitude value; and associating the reorientation start label to the first
location point of the vehicle trip when the first
location point of the vehicle trip is determined to
have the larger longitude value, or associating the
reorientation start label to the last location point of
the vehicle trip when the last location point of the
vehicle trip is determined to have the larger lon-
gitude value;

resequencing the plurality of location values based on the
reorientation start label;

deriving, from a plurality of geographic tile identifiers
each associated with at least one of the resequenced
plurality of location values, a pairing fingerprint value
for the vehicle trip; and pairing the vehicle trip to at least one previous vehicle trip
based a comparison of the pairing fingerprint value for
the vehicle trip to a database of fingerprint values of
previous trips.

12. The method of claim 1 further comprising:

prior to associating the reorientation start label to the one
of the plurality of location values based on the latitude
value associated with the one of the plurality of loca-
tion values, commuting (i) the latitude value associated
with the one of the plurality of location values to a
non-negative value, and/or (ii) the longitude value
associated with the one of the plurality of location
values to a non-negative value.

* * * * *